Warren K. Lewis
Edwin R. Gilliland    Inventors

By *Henry Berk*    Attorney

June 5, 1956 W. K. LEWIS ET AL 2,749,094
METHOD OF HEAT EXCHANGE BETWEEN LIQUIDS
Filed Dec. 1, 1953 2 Sheets-Sheet 2

Warren K. Lewis
Edwin R. Gilliland  Inventors

By Henry Berk  Attorney

United States Patent Office 2,749,094
Patented June 5, 1956

2,749,094

METHOD OF HEAT EXCHANGE BETWEEN LIQUIDS

Warren K. Lewis, Newton, and Edwin R. Gilliland, Arlington, Mass., assignors to Esso Research and Engineering Company, a corporation of Delaware Application December 1, 1953, Serial No. 395,422

13 Claims. (Cl. 257—1)

This invention relates to a novel method of heat exchange between two liquids having a common volatile component. Specifically, the invention relates to a method of heat exchange between two liquids by means of an inert gaseous medium which prevents direct contact between the two liquids. By the term "inert" is meant a gas which has low solubility in the liquid phases and which is chemically and physically non-reactive with the components of the liquids in all phases and which is chemically and physically non-reactive with the heat exchange equipment. The function of the inert gas is to make it possible to have a negligible difference in pressure along the path of flow despite large differences in pressure of volatile vapors in the direction of flow, inherent in the differences in temperature.

The heat exchange systems to be described are peculiarly advantageous the lower the temperature level involved. The invention has specific application to recovery of refrigeration in chemical reactions conducted at subatmospheric temperatures, e. g., recovery of refrigeration by heat exchange between cold reactor solution resulting from the low temperature so-called "solution" butyl rubber process, and fresh feed to the process; in propane dewaxing wherein wax-free lube oil containing propane as the cold liquid is caused to flow countercurrently to the lube stock to be dewaxed as the warmer liquid; etc.

In its broadest aspects two liquids of different temperature levels, e. g., feed and product of a low temperature chemical reaction, are caused to flow countercurrent to each other through successive stages of indirect contact, direct contact between the two liquids being prevented by an intervening vapor phase containing an "inert" gas, but with transfer of vapor of the common volatile component out of one liquid through the vapor phase into the other liquid in stages.

The invention is more readily understood by reference to the accompanying drawings which are semi-diagrammatic sketches in sectional elevation of typical apparatus for carrying out the heat exchange process.

Figure 1:
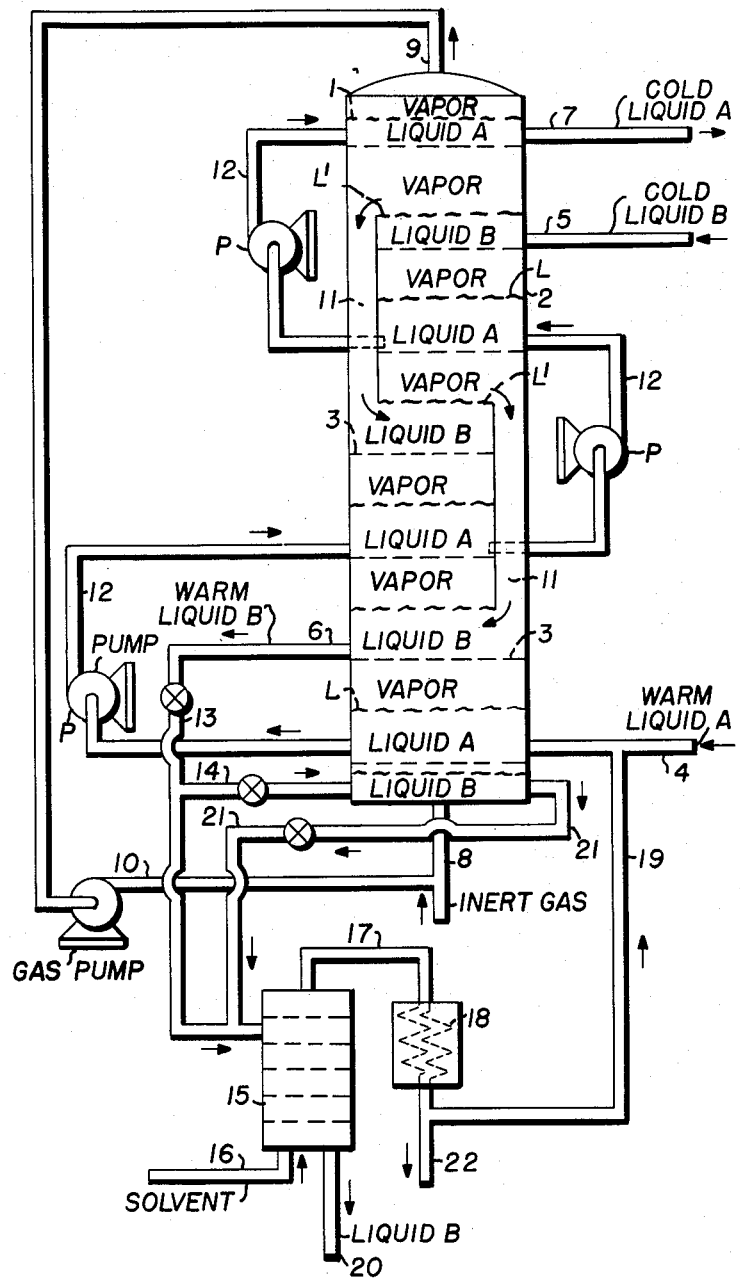

In the process of Figure 1 an inert gas is employed to maintain substantially constant operating pressure in the vessel at a level substantially above the vapor pressure of the incoming hot feed, for two purposes, i. e., first, so that variations in pressure are sufficiently low so that liquid flows can be maintained by practically attainable differences in liquid level, and second, so that direct mass flow of vapor from the hot end to the cold end of the unit is prevented.

Figure 2:
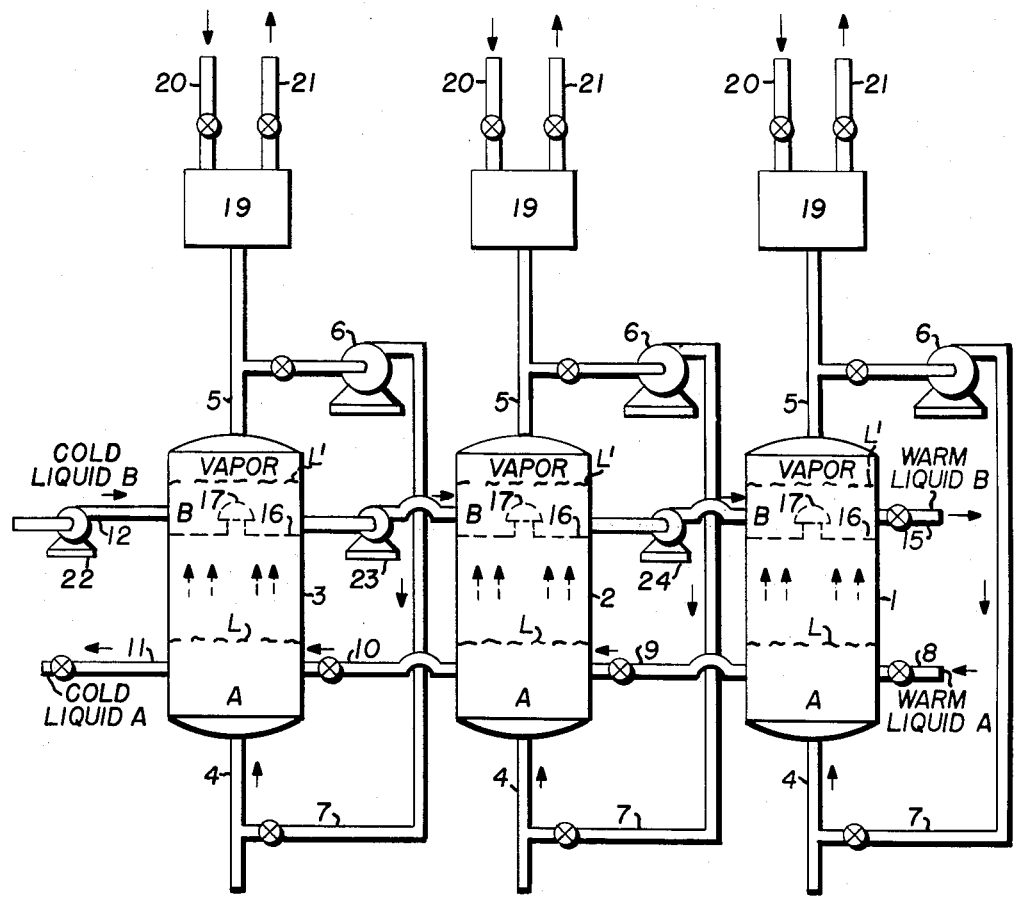

Figure 2 represents a process wherein the heat exchange is effected in a series of contact zones operating at progressively different pressures, i. e., high pressure in the warm region when the vapor pressure of the vapor is high and low pressure in the colder region where the vapor pressure is low. This variant pressure process has the advantage of high heat transfer capacity per unit cross sectional area of the vessel. A considerable amount of heat can be transferred in a small drum, rather than a relatively long tower, thereby making it possible to work with a very low temperature difference. This is extremely advantageous where refrigeration is expensive.

Referring to Figure 1, numeral 1 represents a staged, elongated, vapor-liquid contacting vessel having a shell 2, a number of gas-pervious plates 3 which may be ordinary perforated plates, bubble-cap plates etc., a first liquid inlet 4, a second inlet 5, a first liquid outlet 6, a second liquid outlet 7, a gas inlet 8, a gas outlet 9, gas recirculation conduit 10, downcomers 11 to convey liquid from an upper stage to a lower stage, and conduits 12 to convey pump-actuated liquid from a lower stage to an upper stage.

The operation of the heat exchange process in the equipment of Figure 1 will be illustrated with respect to the cooling of incoming feed to a low temperature polymerization process with cold reaction product polymer. One type of polymerization process developed for the production of synthetic rubber is the so-called low-temperature "solution butyl" process. This type of process is adequately described in British Patent No. 682,695, dated November 12, 1952, which is hereby incorporated by reference. In this process there is employed a volatile liquid which is a solvent both for the reaction mixture and for the polymer product. In the process the primary raw materials are mono-olefins alone or in combination with poly-olefins, e. g., isobutylene and a poly-olefin of 4 to 14 carbon atoms per molecule, but particularly the combination of isobutylene and isoprene. There is also required a liquid which is a solvent both for the olefin reactants and the product polymer at the low reaction temperatures. This solvent is non-reactive, and also inert to the Friedel-Crafts active metal halide type reaction catalyst. The solvent is used in such quantities as to give a fluid solution of the polymer product at the reaction temperatures. Such solvents are low boiling saturated hydrocarbons (or mixtures thereof) boiling between $-40°$ C. and $+69°$ C. The solvent should be substantially free of unsaturates. Suitable solvents are propane, the isomeric butanes, pentanes, hexanes or mixtures thereof, particularly light petroleum naphthas. The heptanes and octanes alone are useable but not preferred because of their higher boiling points. Preferred solvents are propane, normal butane or isopentane. The raw olefinic materials and the solvent are mixed in appropriate blending equipment and introduced with an appropriate amount of Friedel-Crafts active metal halide catalyst, e. g., $AlCl_3$-methyl chloride, into a low temperature reaction zone maintained at a temperature of $0°$ C. down to $-164°$ C., but preferably in the range of $-35°$ or $-40°$ C. and $-103°$ C. From this reaction zone there is obtained a cold reaction product comprising a dilute solution of copolymer product (elastomer) dissolved in the n-butane solvent. The copolymer has a Staudinger molecular weight number between 35,000 and 60,000 and remains dissolved in the n-butane solvent.

Returning now to Figure 1 a liquid mixture of isobutylene, isoprene and normal butane (liquid A) at atmospheric temperature and at superatmospheric pressure of the liquified constitutents of about 75 p. s. i. absolute is introduced via line 4 into the bottom-most stage of tower 1. At the same time an inert gas, such as nitrogen or methane, is pumped via line 8 into the bottom portion of the tower 1. This gas passes through the body of liquid in the lowermost stage. Through pipe 4 is introduced all the liquid to be cooled in the heat exchange process. Automatic control for flow of this liquid is provided, for example, by means of a pump P which will pump liquid but not vapor. By proper operation of pump P there is maintained a level L of liquid A on each alternate ascending stage of the tower.

The inert gas together with hydrocarbons, predominantly $C_4$'s, vaporized from the liquid A, ascend through the plates in each of the various stages eventually reaching the uppermost vapor space at the top of the tower. Cold copolymer solution (liquid B), i. e., isobutylene-isoprene copolymer dissolved in normal butane, and containing unconverted isobutylene and isoprene, is introduced (at about −100° C.) via pipe 5 into the top stage of the tower and flows down the tower by gravity, bypassing the stage immediately below it. In its flow the liquid B reaches a level L' in each stage that it enters. Simultaneously with the downflow of liquid B via downcomers 11, liquid A is pumped via lines 12 from a lower stage to an upper stage. During the flow of these liquids they are kept out of direct contact with each other by means of the gas or vapor phase intervening between the stages. The gas ascending the tower progressively gives up its vapors and its heat to the descending cold liquid B. In each successive stage it is reheated by passage through liquid A, whereupon the procedure is repeated, each ascending liquid A stage becoming colder and colder and each descending stage of liquid B becoming warmer and warmer until the cold liquid A is removed via pipe 7 and sent through a final stage of refrigeration to the low temperature polymerization process, while warm copolymer product solution is removed from the lowermost stage of liquid B via pipe 6. Inert gas containing some small amounts of volatile hydrocarbons is removed from the uppermost vapor phase via pipe 9 and with the aid of a gas pump recycled via pipe 10 to line 8 for reuse again in the process.

The inert gas balances the pressure in the tower, constant pressure being maintained by the mixture thereof with the volatile hydrocarbon vapors. In the bottom of the tower, which is warmer, there is a high percentage of hydrocarbons in the vapor (from the vaporization of solvent and reactants in the warm feed) and a small amount of inert gas. In the top of the tower, which is colder, the reverse is true and the vapor phase comprises inert gas with only a relatively small amount of hydrocarbons.

By this procedure, the fresh feed leaves the tower and enters the reaction zone at a temperature close to the polymerization temperature, while the dilute polymer solution leaves the tower at a temperature close to the atmospheric temperature of incoming feed, with the major heat losses being that due to the temperature gradient through the metal tower surfaces and to the limited number of stages.

This method of heat exchange is particularly applicable to viscous liquids due to the mixing action of the gas bubbling through the liquid, and more particularly when the viscous liquid is dissolved in solution, or where fouling of the surface develops. The heat exchange technique is satisfactory where the solvent is non-reactive and the reactants non-volatile. Where the reactants are volatile provision can be made for their removal from the warmed product and their return to the warm feed as will now be explained.

Referring to Figure 1, where the hot liquid A entering at 4 contains volatile reactants, these will evaporate in part in the bottom of the column and condense into warm liquid B leaving at 6. This need in no way interfere with the heat exchange in the column. But it does means that provisions must be made for handling the volatile reactants leaving at 6. These reactants must be recovered and recycled to line 4, or handled in some equivalent way.

One method of eliminating volatile reactants from the exiting stream of warm liquid B is as follows: The stream is led from pipe 6 via pipe 13 to an upper portion of stripper 15. Solvent vapor free of volatile reactants is pumped into the bottom of stripper 15 via pipe 16 and strips the volatile reactants from the warm liquid. The polymer dissolved in the solvent and free of volatile reactants is removed from the stripper via pipe 20. Volatile reactants plus some solvent vapor is removed overhead via line 17 from the stripper. It is cooled in cooler 18 and returned at least in part via line 19 to liquid A feed line 4. A portion of the cooled reactants may be removed from the system if desired via pipe 22. This operation makes it possible to keep the polymer in solution at all times despite the elimination of volatile reactants.

Where the amount of volatile reactants in warm liquid B leaving via pipe 6 is relatively large it may be desirable to put an additional plate at the bottom of tower 1 below the liquid A feed plate and flow the discharge from 6 via lines 13 and 14 through that plate. This enables one to take advantage of the low vapor content of the gas leaving through pipe 9 and recycled through pipe 10 to strip a very considerable fraction of volatile reactants out of the stream from 6, thus lessening the load on the recovery equipment such as that shown in vessel 15. This step is taking advantage of the very marked wet-bulb temperature depression effect obtainable in the liquid in the bottom of the column by the action upon it of the relatively vapor-free recycle inert gas through 10. Liquid B is removed from the bottom plate via pipe 21 and sent to stripper 15 for complete removal of volatile reactants in the manner previously recited.

When one or both of the liquids undergoing heat exchange contains a component which tends to undergo reaction with another component or to initiate or catalyze a reaction e. g. methyl chloride-AlCl₃ solution catalyst in liquid A above, this fact need not preclude the use of this procedure for heat exchange. To minimize reaction tendency, tower 1 is operated with a low liquid hold-up, i. e., the liquid level on the plates is low. This low level of liquid interferes little with the heat exchange.

Proper choice of solvents of varying volatility can help greatly in the heat exchange operation in Figure 1 when applied to the "solution" butyl rubber process. Thus, granting the presence of large quantities of isobutylene as one of the reactants and, granting furthermore, that it is desirable to maintain a minimum amount of solvent in the solution at all points in the operation, because of its limited volatility the use in the feed stream of this amount of a solvent such as hexane or heptane practically guarantees its retention as such in the liquid at all points. On the other hand, granting that it is desirable to minimize the transfer of the reactant isobutylene from the feed stream to the product stream, one can accomplish this by the introduction into the feed stream of enough propane as a solvent constituent to take care of all the heat transfer required in the operation. This will mean that the liquid on the bottom plate will be cooled almost exclusively by evaporation of propane, and the liquid on the plate immediately above will be heated predominantly by condensation of some of this propane. The isobutylene evaporation and condensation will contribute to the heat transfer to only a limited extent and the hexane or heptane will contribute scarcely anything. In other words, proper proportioning of the solvent constituents as to volatility, relative to each other and to the other constituents, gives one control of the concentration changes in the liquid phase which are inherent in this operation.

As previously recited the heat exchange process illustrated in Figure 2 can be carried out at constant pressure or at variant pressures. When operating at constant pressure inert gas is employed as in the process of Figure 1. In this manner interstage pumping of liquids is avoided as liquid flow therein is all by gravity. Operation at variant pressures is effected by eliminating or minimizing the inert gas in which event the warmest vessel 1 operates at a high pressure, vessel 2 at an intermediate pressure and vessel 3 at a low pressure. In this event pumps are required to circulate the liquid between the vessels. In practice most liquids will have inert gas dissolved therein and provision must be made for its removal, as by conventional means, otherwise the system will become gas-bound.

Referring to Figure 2 a series of contact vessels 1, 2, and 3 is shown which operate at succeedingly lower pressures. Vessel 1 is a high pressure zone, vessel 2 an intermediate zone, and vessel 3 a low pressure zone. Each vessel contains in its bottom section liquid A to a level indicated by L, and in its upper section liquid B to a level indicated by L'. Each vessel is equipped with a gas-liquid separation device 16, e. g., bubble cap 17, etc. Each vessel is equipped with gas line 4 from which inert gas may enter the bottom of the pool of liquid A and passes upwardly into the vapor space above level L, then through bubble-cap 17 into liquid pool B, and out of the vessel via line 5 into its respective gas holder 19. Gas is recirculated via pump 6 through line 7 for reuse in the heat exchange process. Inert gas enters the system from gas holder 19 via line 20. Each of the vessels 1, 2, and 3 operates within its own allowable range of differential pressure which of course will be small. Each of the gas holders 19 therefore is equipped with gas inlet lines 20 and gas outlet lines 21. The flow of gases in these lines is controlled by appropriate automatic valves. Whenever the operating pressure in one of the vessels 1, 2, or 3 falls below the allowable range thereof gas is admitted into the system via line 20. When the allowable pressure is exceeded gas emerges from the system via line 21. Liquid A flows successively through three vessels 1, 2, and 3 via lines 8, 9, and 10 and leaves the system via line 11. Liquid B flows successively through vessels 3, 2, and 1 via pipes 12, 13, and 14 with the aid of pumps 22, 23, and 24 and leaves the system via line 15. The process of Figure 2 will be illustrated using the same liquids A and B as in Figure 1. Liquid A (isobutylene, and isoprene dissolved in normal butane) at atmospheric temperature and at superatmospheric pressure of above 40 p. s. i. a., e. g. 75 p. s. i. a., is introduced into the lower section of vessel 1 via pipe 8 at a rate sufficient to maintain therein a pool of liquid indicated by level L. At the same time liquid B (isobutylene-isoprene copolymer dissolved in normal butane and containing unreacted isobutylene and isoprene monomers) is pumped at about —100° C. into vessel 3 at the upper section thereof via pipe 12 at such a rate as to maintain a level L' on plate 16. Previously, inert gas under sufficient pressure had been passed from holder 19 into each of the vessels 1, 2, and 3 respectively, via pipes 7 and 4. Liquid A flows successively from vessel 1 to vessel 2, etc., while liquid B flows successively from vessel 3 to vessel 2 and then to vessel 1. Inert gas passing through liquid A in vessel 1 picks up heat therefrom and sweeps vaporized hydrocarbons from the liquid pool. The gas mixture enters the vapor space above the liquid and bubbles through the cooler liquid B on the plate above. The vaporized hydrocarbons recondense in the liquid B and pass out of the vessel with liquid B via line 15. Inert gas and any uncondensed hydrocarbons leave the vessel via line 5, and by means of pump 6 is recycled to its own vessel via lines 7 and 4.

Liquid A flows from vessel 1 to vessel 2 via line 9 and the process of vessel 1 is repeated therein. The same procedure is repeated when the liquid A flows from vessel 2 to vessel 3 via line 10. Liquid A finally leaves the system via line 11 at about approximately the temperature of incoming liquid B to the process (via line 12) viz., minus 100° C. (less any loss of heat due to temperature gradient through the metal tower surfaces.

Cold liquid solution B is pumped from vessel 3 via line 13 to vessel 2 and finally via line 14 to vessel 1 becoming progressively warmer until it emerges from the system via pipe 15 at about the atmospheric temperature of the incoming feed liquid A.

Any number of intermediate vessels 2 can be employed between the initial and final contact vessels 1 and 3 depending upon the degree of cooling desired. In some cases a total of only two vessels will suffice with no intermediate stage being employed.

In the operation of the process of Figures 1 and 2, it is very desirable to be able to exercise operating control of the ratio of the flow rates of recycled inert gas to the flow rates of the liquid streams. The larger the ratio the more vapor can be carried up the tower and the higher the corresponding heat flux from the hot liquid stream on one plate to the cold stream on the plate above it. This makes it possible to operate with lower temperature differences between the streams and, therefore, more efficiently. However, if the flow of inert gas gets excessive its sensible heat effects will interfere with refrigeration because it inevitably picks up heat at the bottom of the column and gives it up to the liquid stream at the top.

It will be observed from the operations of the systems of Figures 1 and 2 that it is desirable to circulate the least amount of inert gas that will enable the operation to perform effectively. In the process of Figure 1 as one goes up the column the vapor pressure of the liquid drops. Therefore one needs more inert gas to carry the vapor at the operating pressure. In the bottom of the tower this amount of inert vapor is excessive. The process of Figure 1 therefore sacrifices thermal efficiency in order to secure simplicity of construction and operation. However, refrigeration is expensive and it oftentimes becomes mandatory to secure the highest thermal efficiency. In this event the process of Figure 2 is recommended in which one can control the ratio of inert gas to vapor independently of the temperature and therefore independently of the vapor pressure by control of the total pressure of the system. The operation of Figure 1 sacrifices control of the total pressure. The process of Figure 2 adjusts the total pressure to the vapor pressure level and therefore to the temperature level.

What is claimed is:

1. In a process for transferring heat into a relatively cool liquid from a relatively warm liquid which contains a relatively volatile component, the improvement which comprises flowing the relatively warm liquid through a series of vapor-liquid contacting stages, flowing the relatively cool liquid through a separate series of vapor-liquid contacting stages without any direct contact between the two liquids, maintaining an inert vapor phase containing said volatile component above the liquid phase of substantially each vapor-liquid contacting stage, withdrawing vapor relatively rich in said volatile component from the vapor phase of substantially each contacting stage wherein said relatively warm liquid is present and passing the withdrawn vapor into contact with the relatively cool liquid in a contacting stage wherein the relatively cool liquid is present at a temperature adapted to cause condensation of said volatile component from said withdrawn vapor, removing vapor relatively poor in said volatile component from the vapor phase of substantially each contacting stage wherein said relatively cool liquid is present, and passing this removed vapor into contact with the relatively warm liquid in a contacting stage wherein the relatively warm liquid is present at a temperature adapted to cause evaporation of its volatile component into the vapor which is being contacted therewith.

2. In a process for conserving refrigeration from a liquid B cooled to a sub-atmospheric temperature by using this refrigeration for cooling a different, relatively warm liquid A which contains a relatively volatile component, the improvement which comprises flowing the liquid A as a substantially continuous liquid stream through a series of cooling stages at progressively lower temperature, flowing the liquid B as a substantially continuous liquid stream through a separate series of heating stages at progressively higher temperature in a generally countercurrent relation to liquid A and in indirect contact therewith, passing an extraneous inert gas through and mixing it with liquid A in its first and warmest cooling stage, whereby said gas is humidified with said relatively volatile component, removing the resulting humidified gas from said warmest cooling stage, passing the removed gas through and mixing it with liquid B in one of its last and warmest heating stages maintained at a temperature such that said gas is dehumidified by condensation of the volatile component in liquid B and the latter is warmed up, removing the resulting dehumidified gas from said last heating stage and passing it through and mixing it with liquid A in its second warmest cooling stage, whereby said gas becomes rehumidified with said volatile component of liquid A and the latter is cooled, removing the resulting rehumidified gas from said second warmest cooling stage, passing the removed rehumidified gas through and mixing it with liquid B in its second warmest heating stage maintained at a temperature such that said gas is again dehumidified by condensation of the volatile component in liquid B and the latter is warmed up further, removing cooled liquid A from the last of its cooling stages, and removing liquid B from the last of its heating stages.

3. A process for effecting heat exchange between two liquids containing a common volatile component which comprises, introducing cold liquid B at a temperature below $-35°$ C. into a pool of liquid B maintained in an uppermost stage of a staged elongated contacting zone, introducing warm liquid A into a pool of liquid A maintained in a lowermost stage of said zone, maintaining alternate pools of liquids A and B in said zone in indirect contact with each other, and separated from each other by a vapor phase of an inert gas and said volatile component, passing an inert gas through said lowermost pool of liquid A thereby removing vapors of said volatile component from liquid A and with it forming a vapor phase above liquid A, passing said vapor phase upwardly through liquid B in the stage immediately above it and recondensing a portion of said volatile component in colder liquid B repeating the passage of said vapor phase successively upwardly through liquids A and B, passing liquid B progressively downward and liquid A progressively upward in said zone whereby liquid B becomes progressively warmer and liquid A becomes progressively colder, removing warm liquid B from a lower end of said zone, and cold liquid A from an upper end of said zone, and removing a stream of cold inert gas from an upper end of said zone.

4. A process according to claim 3 in which the inert gas is nitrogen.

5. A process according to claim 3 in which the liquid B comprises a solution of an isobutylene-isoprene polymer and monomers in n-butane, and liquid A comprises a solution of isobutylene and isoprene monomers in n-butanes.

6. A process according to claim 5 in which monomers of isobutylene and isoprene are stripped out of warm liquid B and returned to warm liquid A feed.

7. A process according to claim 6 in which the stripping is accomplished by means of vapors of n-butane.

8. A process according to claim 6 in which the stripping is partially accomplished by passing cold inert gas through a pool of warm liquid B.

9. A process according to claim 8 in which the cold inert gas is passed through liquid B into the lowermost pool of liquid A.

10. A process for effecting heat exchange between two liquids of different temperature levels and containing a common volatile component which comprises, providing a series of variant pressure liquid-vapor contacting zones containing in each a lower pool of liquid B, said pools in each zone being separated by a vapor phase of said volatile component, passing warm liquid A successively from a high pressure zone to a low pressure zone through the bottom portions thereof, passing cold liquid B originally at a temperature below $-35°$ C. successively in the opposite direction from said low pressure zone to said high pressure zone through the upper portions thereof, passing vapors of said volatile component vaporized from said pool of liquid A in each zone upwardly through said pool of liquid B in each said zone, thereby condensing a portion of said vapors therein, removing vapors of said volatile component from a vapor phase above each pool of liquid B, removing warm liquid B from said pool of liquid B in said high pressure zone, and removing cold liquid A from said pool of liquid A in said low pressure zone.

11. A process according to claim 10 in which at least one intermediate pressure zone exists between the high and low pressure zones.

12. A process for effecting heat exchange between two liquids of different temperature levels and containing a common volatile component which comprises, providing a series of liquid-vapor contacting zones operating at substantially constant pressure with respect to each other, each of said zones containing a lower pool of liquid A and an upper pool of liquid B, said pools in each zone being separated from each other by a vapor phase of inert gas and vapors of said volatile component, passing warm liquid A successively through the bottom portions of said zones, passing cold liquid B successively in the opposite direction through the top portions of said zones, passing inert gas through said pool of liquid A in each zone thereby vaporizing said volatile component from said liquid A, passing inert gas and vaporized volatile component in each zone upwardly thrungh said pool of liquid B in each said zone thereby recondensing a portion of said vapors of said volatile component therein, removing a stream of inert gas containing vapors of said volatile component from a vapor phase above each pool of liquid B, removing warm liquid B from the zone to which warm liquid A feed was introduced, and removing cold liquid A from the zone to which cold liquid B feed was introduced.

13. A process according to claim 12 in which the stream of inert gas containing vapors of said volatile component is recycled through the pool of liquid A in said zone from which it was removed.

References Cited in the file of this patent

UNITED STATES PATENTS

| Number | Name | Date |
|---|---|---|
| 585,365 | Skiffington | June 29, 1897 |
| 2,372,846 | Nettel et al. | Apr. 3, 1945 |
| 2,560,077 | Bloomer et al. | July 10, 1951 |
| 2,611,739 | Otto | Sept. 23, 1952 |
| 2,615,833 | Dean et al. | Oct. 28, 1952 |